(12) United States Patent
Wu

(10) Patent No.: US 10,929,572 B2
(45) Date of Patent: Feb. 23, 2021

(54) SECURE DATA STORAGE DEVICE WITH SECURITY FUNCTION IMPLEMENTED IN A DATA SECURITY BRIDGE

(71) Applicant: NYQUIST SEMICONDUCTOR LIMITED, Grand Cayman (KY)

(72) Inventor: Zining Wu, Los Altos, CA (US)

(73) Assignee: Nyquist Semiconductor Limited, Grand Cayman (KY)

( * ) Notice: Subject to any disclaimer, the term of this patent is extended or adjusted under 35 U.S.C. 154(b) by 22 days.

(21) Appl. No.: 15/483,718

(22) Filed: Apr. 10, 2017

(65) Prior Publication Data

US 2018/0293407 A1    Oct. 11, 2018

(51) Int. Cl.
| | |
|---|---|
| G06F 21/78 | (2013.01) |
| H04L 9/32 | (2006.01) |
| G06F 21/60 | (2013.01) |
| H04L 9/08 | (2006.01) |
| G06F 21/80 | (2013.01) |

(52) U.S. Cl.
CPC ............ *G06F 21/78* (2013.01); *G06F 21/602* (2013.01); *G06F 21/80* (2013.01); *H04L 9/0897* (2013.01); *H04L 9/3226* (2013.01); *H04L 9/3234* (2013.01); *H04L 9/3247* (2013.01); *H04L 2209/12* (2013.01)

(58) Field of Classification Search
CPC ........ G06F 21/78; G06F 21/602; G06F 21/80; H04L 9/3226; H04L 9/3234; H04L 9/0897; H04L 2209/12
See application file for complete search history.

(56) References Cited

U.S. PATENT DOCUMENTS

| | | | |
|---|---|---|---|
| 5,949,882 A | 9/1999 | Angelo | |
| 7,136,995 B1 | 11/2006 | Wann | |
| 7,386,734 B2 | 6/2008 | Wann et al. | |
| 7,725,703 B2 | 5/2010 | Hunter et al. | |
| 7,900,057 B2 | 3/2011 | Chiu et al. | |
| 9,069,940 B2* | 6/2015 | Hars ....................... | G06F 21/00 |
| 9,117,086 B2* | 8/2015 | Werner ................. | G06F 21/602 |
| 2005/0182973 A1* | 8/2005 | Funahashi ............... | G06F 21/34 726/19 |
| 2005/0195975 A1* | 9/2005 | Kawakita .............. | H04L 9/0822 380/30 |
| 2009/0121029 A1* | 5/2009 | Asnaashari ........... | G06F 13/387 235/492 |
| 2010/0100721 A1* | 4/2010 | Su ....................... | G06F 11/1456 713/150 |
| 2011/0060920 A1* | 3/2011 | Kisters .................... | H04L 63/06 713/189 |
| 2011/0110519 A1* | 5/2011 | Suzaki .................. | H04L 9/0625 380/255 |

(Continued)

*Primary Examiner* — Mohammad A Siddiqi
(74) *Attorney, Agent, or Firm* — Vista IP Law Group, LLP

(57) ABSTRACT

A storage device includes: a controller; a storage medium coupled to the controller; and a data security bridge comprising a security module and a key management module; wherein the security module is configured to perform data encryption and/or data decryption; and wherein the key management module is configured to obtain a first security key stored in the storage device, obtain a second security key received by the storage device, and perform a user authentication based on the first security key and the second security key.

37 Claims, 7 Drawing Sheets

(56) References Cited

U.S. PATENT DOCUMENTS

| | | | | |
|---|---|---|---|---|
| 2012/0303943 | A1* | 11/2012 | Tamura | G06F 21/44 |
| | | | | 713/2 |
| 2013/0151761 | A1* | 6/2013 | Kim | G06F 21/78 |
| | | | | 711/103 |
| 2013/0303276 | A1* | 11/2013 | Weston | A63F 13/235 |
| | | | | 463/29 |
| 2013/0318358 | A1* | 11/2013 | Wang | G06F 21/31 |
| | | | | 713/182 |
| 2014/0068280 | A1* | 3/2014 | Yoshimi | G09C 1/00 |
| | | | | 713/194 |
| 2014/0129847 | A1* | 5/2014 | Lee | G06F 21/10 |
| | | | | 713/193 |
| 2016/0006722 | A1* | 1/2016 | Moulin | H04L 9/3247 |
| | | | | 713/156 |
| 2016/0285892 | A1* | 9/2016 | Kishinevsky | G06F 12/1408 |
| 2016/0379015 | A1* | 12/2016 | Samsonov | G06F 21/6209 |
| | | | | 713/193 |
| 2017/0076522 | A1* | 3/2017 | Ives-Halperin | G06Q 10/02 |
| 2017/0078095 | A1* | 3/2017 | Iyer | H04L 63/083 |
| 2019/0327093 | A1* | 10/2019 | Habraken | H04L 63/0227 |

\* cited by examiner

SECURE DATA STORAGE DEVICE WITH SECURITY FUNCTION IMPLEMENTED IN A DATA SECURITY BRIDGE

FIELD

The field of the application relates to data storage devices and associated methods.

BACKGROUND

As more and more data are collected every day, security is becoming more and more important. Hard disk drive (HDD) and solid state drive (SSD) are two examples of storage devices that store data. These devices store data in clear text, and are connected to a motherboard through standard connectors, such as SATA connector, m.2 connector (for SATA or PCIe), U.2 connector (for PCIe), etc. One benefit of such storage devices is that they can be unplugged from one computer, and connect to another computer (e.g., docking station) for allowing data to be read out at the other computer.

New storage devices, systems containing such new storage devices, and associated methods of operation are described herein.

SUMMARY

A storage device includes: a controller; a storage medium coupled to the controller; and a data security bridge comprising a security module and a key management module; wherein the security module is configured to perform data encryption and/or data decryption; and wherein the key management module is configured to obtain a first security key stored in the storage device, obtain a second security key received by the storage device, and perform a user authentication based on the first security key and the second security key.

Optionally, the storage device also includes a first interface for communication with a station, and a second interface configured to allow communication between the data security bridge with the controller.

Optionally, the first interface and the second interface are of a same type.

Optionally, the first interface and the second interface are of different types.

Optionally, the second interface is an internal interface integrated with the controller.

Optionally, the key management module is configured to perform the user authentication based on the first security key and the second security key each time the storage device is boot up from shutdown mode.

Optionally, the key management module is configured to perform the user authentication based on the first security key and the second security key each time the storage device is waken up from power saving mode.

Optionally, the storage device further includes a first interface and a second interface, wherein the security module is configured to receive data via the first interface, and perform data encryption on the received data to obtain encrypted data; and wherein the second interface is configured to transmit the encrypted data to the controller.

Optionally, the storage device further includes a first interface and a second interface, wherein the controller is configured to retrieve encrypted data from the storage medium, and transmit the encrypted to the security module via the second interface; and wherein the security module is configured to decrypt the encrypted data to obtain decrypted data, and transmit the decrypted data out of the storage device via the first interface.

Optionally, the storage device further includes a housing for accommodating the controller, the storage medium, and the data security bridge.

Optionally, the key management module of the data security bridge comprises a medium configured to store the first security key.

Optionally, the controller, the security module, and the key management module are integrated in an integrated circuit (IC) chip.

Optionally, the second security key is stored in a USB or a cell phone.

Optionally, storage device is configured to communicatively coupled with a bridge of a station via a connector, the connector comprising a SATA connector, a m.2 connector, a PCIe connector, an Ethernet connector, or a U.2 connector.

Optionally, the storage device further includes a wireless receiver, wherein the storage device is configured to obtain the second security key via the wireless receiver.

Optionally, the data security bridge further comprises a random number generator.

Optionally, the storage medium is configured to store encrypted data.

Optionally, the storage medium comprises a spinning disk.

Optionally, the storage medium comprises HDD, or NAND flash.

A station includes the storage device.

Optionally, the station is configured to obtain a user identification that is different from the second security key Optionally, the user identification comprises a user password.

Optionally, the user identification comprises a finger print, a retina scan, or a voice signature.

Optionally, the station is configured to receive the second security key from an external device, and pass the second security key to the key management module in the storage device.

Optionally, the external device comprises a USB.

Optionally, the external device comprises a cell phone.

Optionally, the station includes: a device detector configured to detect the external device; a boot-up and/or wake-up controller configured to pause a boot-up and/or wake-up process in response to the device detector detecting the external device; and a notification generator configured to notify a user to remove the external device.

Optionally, the boot-up and/or wake-up controller is configured to resume the boot-up and/or wake-up process in response to the user removing the external device.

A method performed by a storage device, includes: obtaining a first security key from a medium in the storage device; obtaining a second security key stored in an external device; performing a user authentication by a key management module in the storage device based on the first security key and the second security key; and retrieving encrypted data from a storage medium in the storage device based at least in part on a result of the act of performing the user authentication.

Optionally, the method further includes obtaining a user identification from a user, wherein the encrypted data is retrieved from the storage medium in the storage device if the user identification satisfies a criteria and if the user authentication succeeds.

Optionally, the user identification comprises a user password, a fingerprint, a retina scan, or a voice signature.

Optionally, the external device comprises a USB or a cell phone.

Optionally, the storage device comprises a wireless receiver, and wherein the second security key is obtained by the storage device using the wireless receiver.

Optionally, the method further includes: receiving data at the storage device; and performing data encryption on the received data to obtain the encrypted data.

Optionally, the method further includes: transmitting the encrypted data to a security module in the storage device; decrypting the encrypted data by the security module to obtain decrypted data; and transmitting the decrypted data out of the storage device.

Optionally, the storage device is coupled to a station, and wherein the second security key is transmitted from the external device to the station, which passes the second security key to the storage device.

Optionally, the method further includes: detecting a presence of the external device by the station; pausing a boot-up and/or a wake-up process in response to the detected presence of the external device; and notifying a user to remove the external device.

Optionally, the station further includes resuming the boot-up and/or wake-up process in response to the user removing the external device.

Other and further aspects and features will be evident from reading the following detailed description.

DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Figure 1:
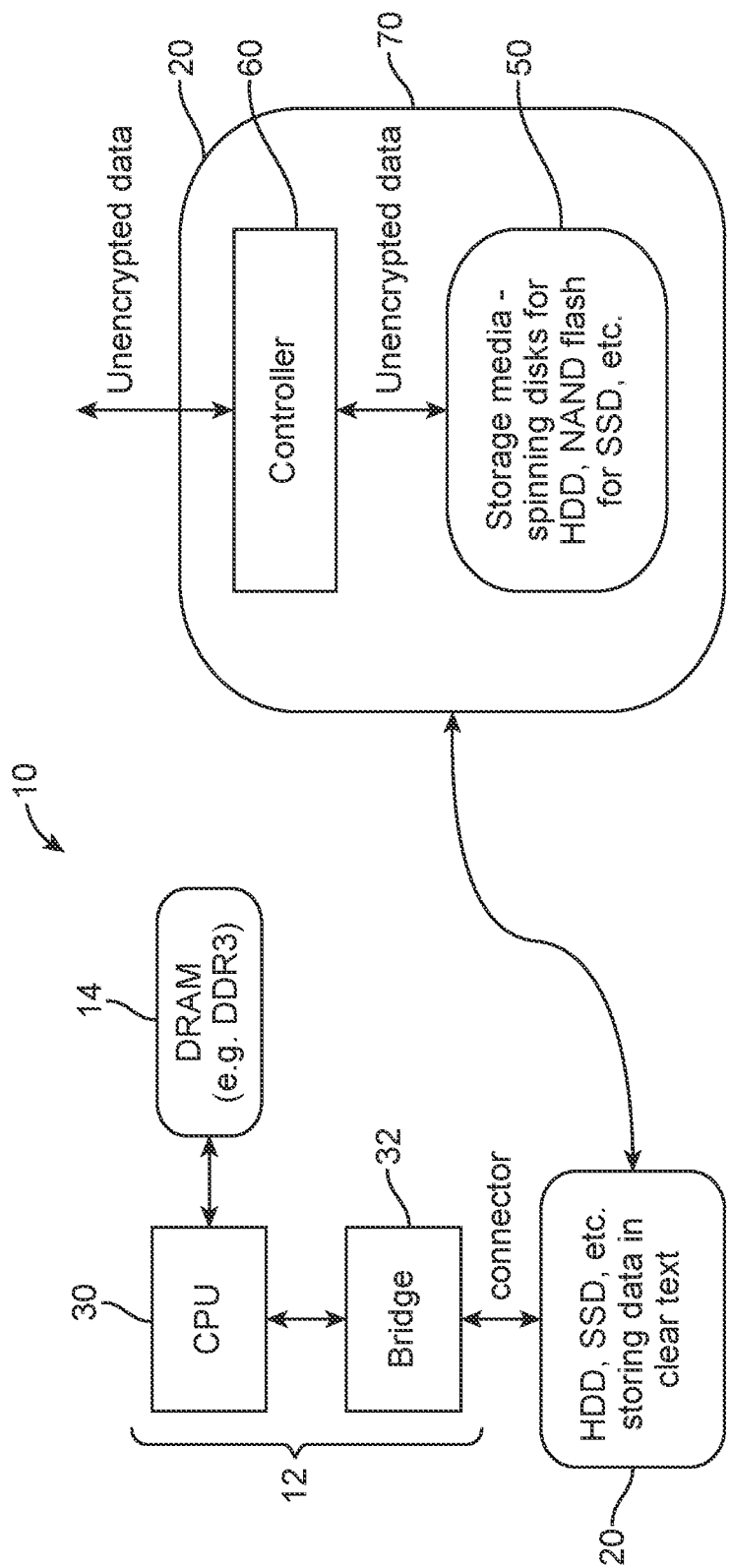
FIG. 1 illustrates a system that includes a storage device.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a system 10 that includes a station 12 and a storage device 20. The station 12 may be a desktop computer, a laptop computer, a server, a drive docking station, or any of other computing devices that is configured to allow a storage device (such as the storage device 20) to secure thereto. The station 12 includes a CPU 30, and a bridge 32. The bridge 32 may be one or more chips communicatively coupled between the CPU 30 and I/Os. In some cases, the bridge 32 may be a south bridge. Also, in some embodiments, the bridge 32 may be integrated with the CPU 30. The storage device 20 is coupled to the CPU 30 of the station 12 via the bridge 32. In some cases, the connection between the storage device 20 and the station 12 may be implemented using a standard connector, such as a SATA connector (for SATA interface), a m.2 connector (for SATA or PCIe), a U.2 connector (for PCIe), or an Ethernet connector. Optionally, the system 10 further includes a memory 14, such as a dynamic random access memory (DRAM) for storing data.

As shown in the figure, the storage device 20 includes a storage medium 50, a controller 60, and a housing 70 containing the storage medium 50 and the controller 60. The storage device 20 may be a hard disk drive (HDD), a solid-state drive (SSD), or any of other types of storage device. The storage medium 50 in the storage device 20 is configured to store unencrypted data (clear text), and the controller 60 of the storage device 20 is configured to retrieve the unencrypted data from the storage medium 50 and to output the retrieved data for transmission to the station 12 of the system 10. The controller 60 is an electrical component within the storage device 20 that enables the CPU 30 of the station 12 to access, read, write, delete and modify data to and from the medium 50. The controller 60 is configured to translate instructions received from the station 12 into something that can be understood by the storage device 20 and vice versa. The instruction from the station 12 may flow through a hard disk adapter, into a hard disk interface and then onto the controller 60, which sends commands to the medium 50 (e.g., disk) for performing a particular operation.

During use, a user of the station 12 may enter a user input via a user interface at the station 12. In some cases, the user input may be a request to store data to the storage device 20. In such cases, the CPU 30 of the station 12 processes the user input and transmits the data in unencrypted form to the controller 60 of the storage device 20. The transmission of the data from the station 12 to the storage device 20 may be accomplished via a SATA connector, a m.2 connector, a 2.U connector, or any of other types of connector. The controller 60 of the storage device 20 processes the data and passes the data in unencrypted form to the storage medium 50 for storage.

In other cases, the user input may be a request to retrieve data from the storage device 20. In such cases, the CPU 30 of the station 12 processes the user input and transmits the request to the controller 60 of the storage device 20. The controller 60 processes the request and retrieve the requested data in unencrypted form from the storage medium 50. The controller 60 then transmits the requested data in unencrypted form to the station 12. The transmission of the data from the storage device 20 to the station 12 may be accomplished via a SATA connector, a m.2 connector, a 2.U connector, or any of other types of connector.

In other cases, instead of being provided by a user of the station 12, the request to store data and/or the request to retrieve data may be received by the station 12 from another device that is in communication with the station 12. The other device may be a peripheral device attached to the station 12, or a remote device connected to the station 12 via the Internet.

One drawback of the 10 system of FIG. 1 is the lack of encryption for data in the storage device 20. A hacker can unplug the storage device 20 from the 10 system, and re-plug it in another station 12. Since the storage device 20 contains a standard interface (e.g., SATA), the hacker can read out its data easily.

Figure 2:
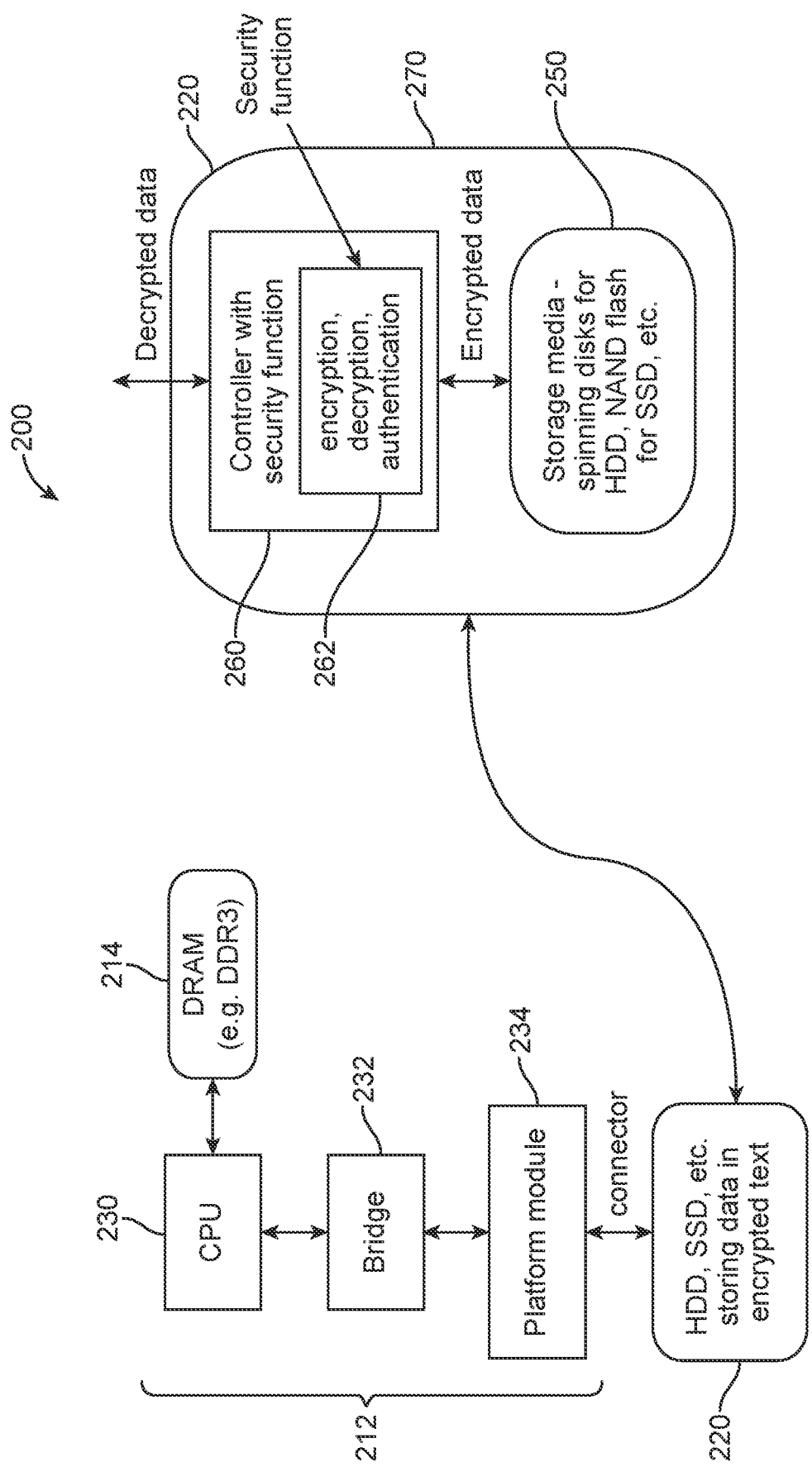
FIG. 2 illustrates another system that includes a storage device.

FIG. 2 illustrates another system 200 that includes a station 212 and a storage device 220. The station 212 may be a desktop computer, a laptop computer, a server, a drive docking station, or any of other computing devices that is configured to allow a storage device (such as the storage device 220) to secure thereto. The station 212 also includes a CPU 230, a bridge 232, and a platform module 234 coupled to the bridge 232. The bridge 232 may be one or more chips communicatively coupled between the CPU 30 and I/Os. In some cases, the connection between the storage device 220 and the station 212 may be implemented using a standard connector, such as a SATA connector (for SATA interface), a m.2 connector (for SATA or PCIe), a U.2 connector (for PCIe), or an Ethernet connector. The platform module 234 may be configured to obtain a password from a user of the station 212 and an identification from the storage device 220 through a user interface, which password and identification may be used by the platform module 234 to perform authentication. Example of platform module 234 includes trusted platform module (TPM), such as that used in computers. Optionally, the system 200 further includes a memory 214, such as a dynamic random access memory (DRAM) for storing data.

As shown in the figure, the storage device 220 includes a storage medium 250, a controller 260, and a housing 270 containing the storage medium 250 and the controller 260. The controller 260 is an electrical component within the storage device 220 that enables the CPU 230 of the station 212 to access, read, write, delete and modify data to and from the medium 250. The controller 260 is configured to translate instructions received from the station 212 into something that can be understood by the storage device 220 and vice versa. The instruction from the station 212 may flow through a hard disk adapter, into a hard disk interface and then onto the controller 260, which sends commands to the medium 250 (e.g., disk) for performing a particular operation. The controller 260 of the storage device 220 includes a security module 262 configured to perform data encryption and data decryption. The storage medium 250 in the storage device 220 is configured to store encrypted data provided by the controller 260. The storage device 220 may be a HDD, a SSD, or any of other types of storage device.

During use, a user of the station 212 may enter a user input via a user interface at the station 212. In some cases, the user input may be a request to store data to the storage device 220. In such cases, the CPU 230 of the station 212 processes the user input and transmits the data in unencrypted form to the controller 260 of the storage device 220. The transmission of the data from the station 212 to the storage device 220 may be accomplished via a SATA connector, a m.2 connector, a 2.U connector, or any of other types of connector. The controller 260 of the storage device 220 receives the unencrypted data from the station 212, encrypts the data to form encrypted data, and passes the encrypted data to the storage medium 250 for storing the encrypted data.

In other cases, the user input may be a request to retrieve data from the storage device 220. In such cases, the CPU 230 of the station 212 processes the user input and transmits the request to the controller 260 of the storage device 220. The controller 260 processes the request and retrieve the requested data in encrypted form from the storage medium 250. The controller 260 then decrypts the encrypted data to obtain unencrypted data, and transmits the requested data in unencrypted form to the station 212. The transmission of the data from the storage device 220 to the station 212 may be accomplished via a SATA connector, a m.2 connector, a 2.U connector, or any of other types of connector.

In other cases, instead of being provided by a user of the station 212, the request to store data and/or the request to retrieve data may be received by the station 212 from another device that is in communication with the station 212. The other device may be a peripheral device attached to the station 212, or a remote device connected to the station 212 via the Internet.

The controller 260 of the storage device 220 also authenticates a command and/or associated data. For example, when storing data, the controller 260 may check the write/store command and/or the data to be stored in order to ensure that the command and/or the data is from a trusted user or a trusted device. In one implementation, the controller 260 may perform authentication of a command and/or data by checking the password entered by a user (through a user interface associated with the platform module 234) to ensure that the user is a trusted user. When retrieving data, the controller 260 may check the retrieval command in order to ensure that the retrieval command is from a trusted user or a trusted device. Again, this may be achieved by checking the password entered by the user via the user interface associated with the platform module 234.

Accordingly, the controller 260 of the storage device 220 includes encryption, decryption, and authentication functions. In some cases, the security module 262 of the controller 260 of the storage device 220 may include an encryption module for encrypting the clear text into encrypted text, and a decryption module for decrypting the decrypted text. Also, the controller 260 may include an authenticator for performing authentication of data. For example, the authenticator may check a password inputted by a user of the storage device 220 to ensure that the user is a trusted user.

Figure 3:
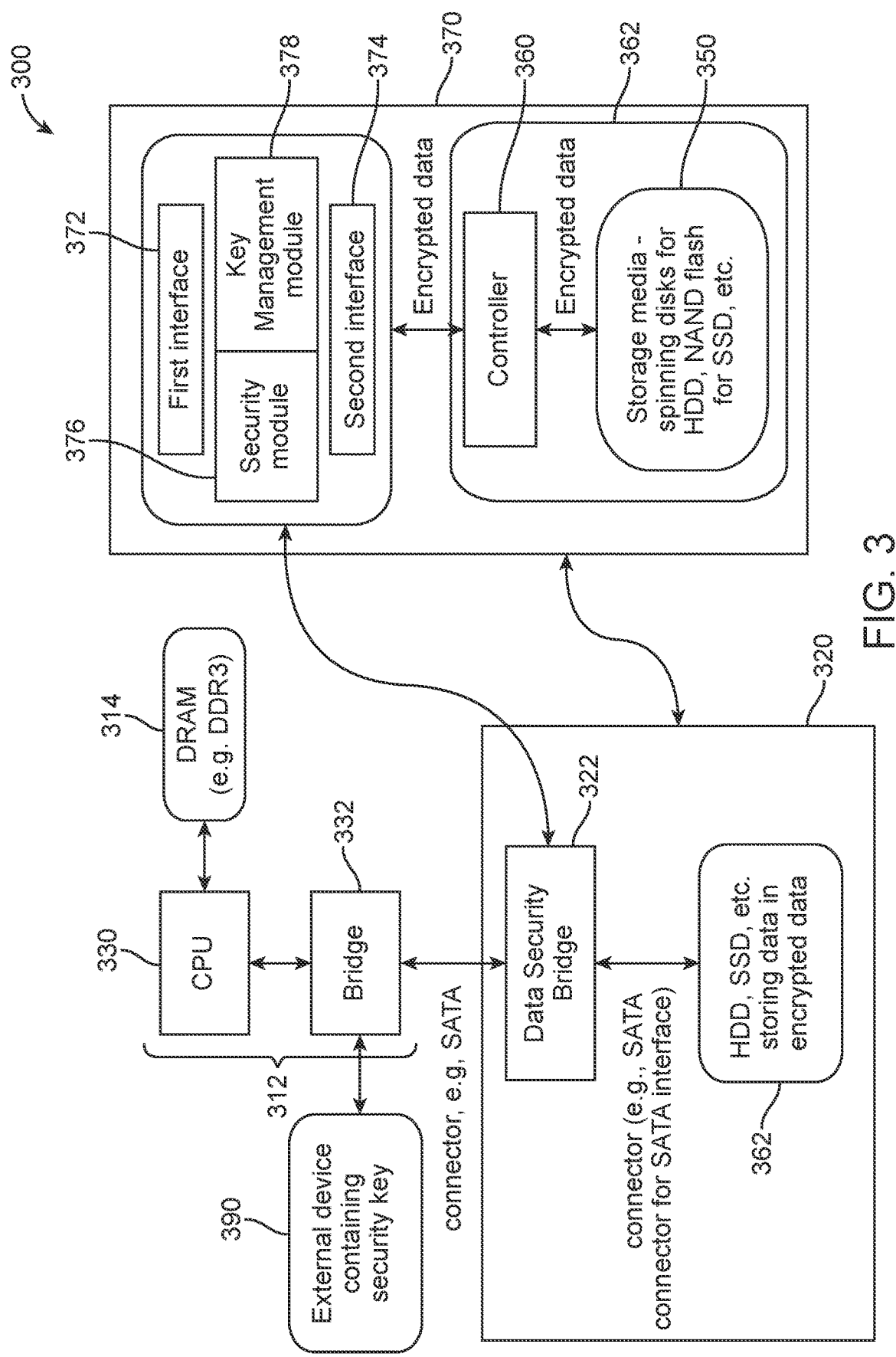
FIG. 3 illustrates another system that includes a storage device.

FIG. 3 illustrates a system 300 that includes a station 312 and a storage device 320. The station 312 may be a desktop computer, a laptop computer, a server, a drive docking station, or any of other computing devices that is configured to allow a storage device (such as the storage device 320) to secure thereto. The station 312 also includes a CPU 330, and a bridge 332. Optionally, the system 300 further includes a memory 314, such as a dynamic random access memory (DRAM) for storing data.

As shown in the figure, the storage device 320 includes a data security bridge 322, a storage medium 350, a controller 360, and a housing 370 containing the data security bridge 322, the storage medium 350, and the controller 360. The controller 360 is an electrical component within the storage device 320 that enables the CPU 330 of the station 312 to access, read, write, delete and modify data to and from the medium 350. The controller 360 is configured to translate instructions received from the station 312 into something that can be understood by the storage device 320 and vice versa. The instruction from the station 312 may flow through a hard disk adapter, into a hard disk interface and then onto the controller 360, which sends commands to the medium 350 (e.g., disk) for performing a particular operation. The storage medium 350 in the storage device 320 is configured to store encrypted data. The storage device 320 may be implemented by coupling the data security bridge 322 with a storage mechanism, such as a HDD, a SSD, or any of other types of storage mechanism/product.

The data security bridge 322 is configured to provide security function(s) and or key management. As shown in the figure, the data security bridge 322 includes a first interface 372 configured to communicate with a bridge associated with the CPU 30, and a second interface 374 configured to communicate with the controller 360 of the storage device 320. In the illustrated embodiments, the first interface 372 is configured to communicate with the bridge 332 of the station 312 using a connector, such as a SATA connector, a m.2 connector, a U.2 connector, a PCIe connector, an Ethernet connector, etc. The second interface 374 may also be configured to communicate with the controller 360 using a connector, such as a SATA connector, a m.2 connector, a U.2 connector, a PCIe connector, an Ethernet connector, etc. In some cases, the first interface 372 may be a slave interface, and the second interface 374 may be a master interface. In other cases, the first interface 372 may be a master interface, and the second interface 374 may be a slave interface. In some cases, the first interface 372 are of the same type as the second interface 374, e.g., the first interface 372 being a SATA slave interface, and the second interface 374 being a master interface. In other cases, the first interface 372 are of different type as the second interface 374, e.g., the first interface 372 being a PCIe endpoint interface, and the second interface 374 being a SATA master interface. The data security bridge 322 also includes a security module 376 for data encryption and/or data decryption, and a key management module 378 for key management (e.g., for performing security check).

In some cases, the security module 376 of the data security bridge 322 may include an encryption module for encrypting the data into encrypted data, and a decryption module for decrypting encrypted data to form decrypted data. By means of non-limiting examples, the security module 376 may be configured to perform advanced encryption standard (AES) encryption and decryption, secure hash algorithm 1 (SHA1), elliptical curve cryptography (ECC), any of other symmetric or asymmetric encryption function, any of other symmetric or asymmetric decryption function, etc. Also, in some embodiments, the data security bridge 322 may include a random number generator for generating encryption key and/or decryption key.

The key management module 378 may include an authenticator for performing a security check to authenticate a user. As shown in the figure, the station 312 is configured to obtain a security key from an external device 390 that contains a security key. In one example, the external device 390 is plugged into a USB slot of the station 312. The security key is for use by the data security bridge 322 to perform the security check. In other embodiments, instead of the USB, the device 390 may be any external device, such as a cell phone, an iPad, a tablet, or any of other devices that is capable of storing a security key. In another implementation, the device 390 may include an application configured to generate the security key, which is for checking by the data security bridge 332 of the storage device 320.

Various techniques may be employed by the key management module 378 to perform the security check based on the security key obtained from the external device 390. In one implementation, during an initialization process, the key management module 378 obtains the security key from the external device 390 and registers the security key at the storage device 320. For example, the storage device 320 may store the security key from the external device 390 as a first security key (a reference security key), thereby establishing a "trust" between the external device 390 and the storage device 320. In subsequent use, a user may use the external device 390 to provide its security key (second security key) for processing by the key management module 378. The key management module 378 may compare the security key (second security key) with the first security key (reference key) to determine if they match. If so, then the key management module 378 may determine that the user is a "trusted" user. In other embodiments, in addition to the above-mentioned key check performed by the key management module 378, the user may also be required to provide another form of identification (e.g., user password, finger print, retina scan, voice signature, etc.) at the platform 312. In such cases, if the key management module 378 determines that both the second form of identification and the security key from the external device 390 are correct (i.e., if they match with pre-determined reference identification and reference key), the user can then access encrypted data in storage media 350.

In another implementation, the storage device 320 may contain (e.g., store) a first security key, and the storage device 320 is configured to obtain a second security key provided by the external device 390. During initialization of the storage device 320, the key management module 378 may create a new signature using both the first security key and the second security key. The signature is then stored in the storage device 320 as a reference signature. In subsequent use, the key management module 378 is configured to check a combination of both the first security key and the second security key. In particular, a user may use the external device 390 to provide the second security key to the station 312 or to the storage device 320 directly. The key management module 378 then generates a signature using the second security key and the first security key, and compares the signature with the reference signature. If the signatures do not match (security check fails), then the data security bridge 322 will prevent data from being stored and/or retrieved from the medium 350. If the check passes, then the data security bridge 322 will allow data to be stored and/or retrieved from the medium 350.

In other embodiments, in addition to the above features, the station 312 may obtain a second form of identification from a user. For example, the station 312 may obtain a password from the user, a finger print from the user, a retina feature from a retina scan, or a voice signature from the user, etc. In such cases, if both the second form of identification and the security key check pass, then the data security bridge 322 will allow data to be stored and/or retrieved from the medium 350.

The data security bridge 322 may be implemented using hardware, software, or combination of both. In some cases, the data security bridge 322 may comprise a chip having an integrated circuit configured to perform one or more functions described herein. Also, in some embodiments, the data security bridge 322 may include a processor, such as an ASIC processor, a FPGA processor, a general purpose processor, or any of other processing units, configured to perform one or more functions described herein. In the illustrated embodiments, the data security bridge 322 is implemented as a part of the storage device 320. In other embodiments, the data security bridge 322 is implemented as a part of the station 312. In further embodiments, a first part of the data security bridge 322 may be implemented on the station 312 side, and a second part of the data security bridge 322 may be implemented at the storage device 320.

In some embodiments, a part of the storage device 320 may be implemented using a storage mechanism or product 362 having a conventional configuration. For example, the storage mechanism or product 362 may be a HDD, a SSD, or any of other types of storage mechanism or product. In such cases, the data security bridge 322, or at least a part of it, may be combined with the storage mechanism or product 362 with the conventional configuration to form the storage device 320 with enhanced functionality. In other embodiments, the storage mechanism or product 362 may not have a conventional configuration. Also, in further embodiments, item 362 may not be any conventional product, and may instead merely represent a combination of the controller 360 and the storage mechanism 350.

Also, in some embodiments, the controller 360 may be configured to perform data retrieval from, and/or data writing to, the storage medium 350 without itself having any data encryption and/or data decryption function. For example, in some cases, the controller 360 may have the same configuration as the controller 60, which has no encryption module built therein.

In the above embodiments, the data security bridge 322 is described as having both the security module 376 and the key management module 378. In other embodiments, the data security bridge 322 may include the security module 376 without the key management module 378. In further embodiments, the data security bridge 322 may include the key management module 378 without the security module 376. Also, in other embodiments, the data security bridge 322 may be implemented using sub-components or modules.

During use, the storage device 320 is first initialized. In particular, an initialization process may be performed to initialize the storage device 320. In one implementation, during the initialization process, the key management module 378 obtains a security key provided from the external device 390 (a "trusted" device) and registers the security key with the storage device 320. For example, the key management module 378 may store the security key provided by the external device 390 as a first security key in the storage device 320. Alternatively, there may be a first security key that is already stored in the storage device 320. In such cases, the security key from the external device 390 is a second security key, and the key management module 378 is configured to associate the second security key provided by the external device 390 with the first security key stored in the storage device 320. In one implementation, the key management module 378 may access a first security key stored in the storage device 320, and may create a signature using both the first and second security keys. The signature may be stored in the storage device 320 for later use. Alternatively, or additionally, the key management module 378 may also obtain a second form of identification (such as a password, a voice, a retina feature, etc.) from a user of the station 312 for registration with the storage device 320.

Upon initialization of the storage device 320, data security bridge 322 of the storage device 320 and the security key source 390 (e.g., the USB) establish a one-to-one "trust" or bonding. After initialization, all data to be stored on the medium 350 are encrypted by the data security bridge 322, which then passes the encrypted data to the medium 350.

In subsequent boot up and/or wake up of the station 312, the security keys will be checked and authentication process will be formed. In Boot-up mode, the storage device 320 transitions from shutdown mode to functioning mode. In wake-up mode, the storage device 320 transitions from power saving mode (e.g., standby mode in Windows operating system) or partial shutdown mode (e.g., hibernation mode in Windows operating system) to functioning mode. In subsequent use, the user first couples the external device 390 (e.g., the USB) with the station 312, and the second security key from the external device 390 is transmitted to the key management module 378. The key management module 378 then uses both the first security key stored in the storage device 320 and the second security key provided by the device 390 to perform a security check to ensure that the user is a trusted user. In one implementation, the first security key is a reference security key that was previously stored in the storage device 320. In such cases, the key management module 378 compares the first security key with the second security key to determine if they match. If the first security key and the second security key match, then data transmitted from the station 312 can be encrypted by the security module 376 for storage in the medium 350 of the storage device 320, and/or data from the medium 350 can be retrieved and decrypted by the security module 376 for output to the station 312. In another implementation, if the key management module 378 previously created a signature (reference signature) using both the first and second security keys, the key management module 378 may use the key provided by the device 390 and the stored first security key to generate a signature for comparison with the reference signature. If the signature matches with the reference signature, then data transmitted from the station 312 can be encrypted by the security module 376 for storage in the medium 350 of the storage device 320, and/or data from the medium 350 can be retrieved and decrypted by the security module 376 for output to the station 312.

Alternatively or additionally, a user may provide a second form of identification (such as a password, a voice, retina feature, etc.) in subsequent boot up or wake up of the station 312. The station 312 (e.g., the operating system therein) checks the second form of identification, while the data security bridge 322 checks the security key obtained from the external device 390. The station 312 is allowed to be boot up or woke up and/or the medium 350 of the storage device 320 is allowed to be accessed, if at least both criterion—i.e., (1) that the second form of identification provided by the user matches a predetermined secondary identification, and (2) that the security key obtained from the external device 390 satisfies a security check, are satisfied. After both criterion are satisfied, then data transmitted from the station 312 can be encrypted by the security module 376 for storage in the medium 350 of the storage device 320, and/or data from the medium 350 can be retrieved and decrypted by the security module 376 for output to the station 312.

In some embodiments, to make sure that a user does not keep the USB 390 plugged to the station 312, the station 312 may be configured to pause the boot up and/or wake up process after using the security key on the USB 390 for the security check. The station 312 will then prompt the user to unplug the USB 390 from the station 312. The station 312 continues the boot up process only after the user has unplugged the USB from the station 312. In one implementation, the station 312 may include a USB detector configured to detect the USB 390. The station 312 may also include a boot-up and/or wake up controller configured to pause a boot-up and/or wake-up process in response to the USB detector detecting the USB; and a notification generator configured to notify a user to remove the USB from the station 312. The boot-up and/or wake-up controller is also configured to resume the boot-up and/or wake-up process in response to the user removing the USB from the station 312.

After the storage device 320 is initialized and the station 312 is boot up, a user may then use the medium 350 in the storage device 320.

For example, in some cases, a user of the station 312 may enter a user input via a user interface at the station 312. The user input may be a request to store data to the storage device 320. In such cases, the CPU 330 of the station 312 processes the user input and transmits the data in unencrypted form to the data security bridge 322 via the first interface 372. The transmission of the data from the station 312 to the data security bridge 322 of the storage device 320 may be accomplished via a SATA connector, a m.2 connector, a 2.U connector, or any of other types of connector. The data security bridge 322 of the storage device 320 receives the unencrypted data from the station 312, encrypts the data to form encrypted data, and passes the encrypted data to the controller 360 via the second interface 374. The communication between the second interface 374 of the data security bridge 322 and the controller 360 of the storage device 320 may be accomplished using a connector, such as a SATA connector, a m.2 connector, a U.2 connector, a PCIe connector, an Ethernet connector, etc. In some embodiments, the first interface 372 and the second interface 374 may be of the same type, while in other embodiments, the first interface 372 and the second interface 374 are different types. The controller 360 of the storage device 320 processes the encrypted data and passes the data in encrypted form to the storage medium 350 for storage. In some embodiments, the data security bridge 322 may optionally further performs a security check before the data is stored in the storage medium 350. For example, such may be accomplished by the key management module 378, which uses the second key from the external device 390 to perform the security check.

In other cases, the user input may be a request to retrieve data from the storage device 320. In such cases, the CPU 330 of the station 312 processes the user input and transmits the request to the data security bridge 322 of the storage device 320 via the first interface 372. The transmission of the request from the station 312 to the data security bridge 322 may be performed via a connector, such as a SATA connector, a m.2 connector, a U.2 connector, a PCIe connector, an Ethernet connector, etc. The first interface 372 of the data security bridge 322 receives the request, and passes the request to the controller 360 via the second interface 372. The controller 360 processes the request and retrieves the requested data in encrypted form from the storage medium 350. The controller 360 then passes the retrieved encrypted data to the data security bridge 322 via the second interface 374. The data security bridge 322 then decrypts the encrypted data to obtain unencrypted data, and transmits the retrieved data in unencrypted form to the station 312 via the first interface 372. The transmission of the encrypted data from the controller 360 of the storage device 320 to the data security bridge 322 of the storage device 320 may be accomplished via a SATA connector, a m.2 connector, a 2.U connector, or any of other types of connector. Also, the transmission of the decrypted data from the data security bridge 322 of the storage device 320 to the station 312 may be accomplished via a SATA connector, a m.2 connector, a 2.U connector, or any of other types of connector. In some embodiments, the data security bridge 322 may optionally further performs a security check before the data is retrieved from the storage medium 350. For example, such may be accomplished by the key management module 378, which uses the second key from the external device 390 to perform the security check.

In other cases, instead of being provided by a user of the station 312, the request to store data and/or the request to retrieve data may be received by the station 312 from another device that is in communication with the station 312. The other device may be a peripheral device attached to the station 312, or a remote device connected to the station 312 via the Internet.

The storage device 320 is more advantageous than the storage device 220. This is because the storage device 320 provides a multi-steps security as opposed to the single-step security associated with the storage device 220. In the multi-steps security provided by the storage device 320, if a person takes out the storage device 320 from the station 312 and puts it in another station, then person can only see encrypted data. The person will not be able to decrypt the data because the person will not have the second security key stored in external device 390. Similarly, if a person gets hold of the station 312 and if the person even obtains the password to the station 312, the person also cannot boot up the station 312 because the person does not have the second security key stored in external device 390. In contrast, in the single-step security, if a person takes possession of the station 212 with the storage device 220, and obtains the password, the person may copy out the data easily.

The storage device 320 is also advantageous because the storage device 320 may be functionally more flexible than the storage device 220 in that it can implement any security functions for any countries (e.g., AES for U.S., SM4 for China, etc.). Furthermore, the security functions in the controller 360 of the storage device 320 can be more easily upgraded. If new crypto algorithms are developed, the same controller 360 may be configured to implement any of the new crypto algorithms. Also, in some cases, the data security bridge 322 may accommodate different types of first interface and second interface, thereby allowing one type of storage mechanism or product 362 (e.g. SATA) to be connected to another type of station 312 (e.g, PCIe).

Furthermore, the storage device 320 is more functionally flexible than the storage device 220. This is because if someone takes out the storage device 220 from the station 212 and puts it in another station, then the controller 260 will not enable the decryption function, and all read out data will be scrambled data and cannot be used. On the other hand, if someone takes out the storage device 320 from the station 312 and puts it in another station, data can still be accessed from the medium 350 of the storage device 320 provided that the user also provides the external device 390 that includes the second security key. Accordingly, the storage device 320 provides flexibility in use while enhancing the security of the stored data.

In addition, the storage device 320 is also advantageous because unlike other techniques that are employed to merely make the start-up of computer more secure, the storage device 320 actually allows data stored therein to be more secured. In this regard, even if an unauthorized user removes the storage device 320 from the station 312, the unauthorized user will not be able to access the data stored therein due to the security features described herein.

Figure 4:
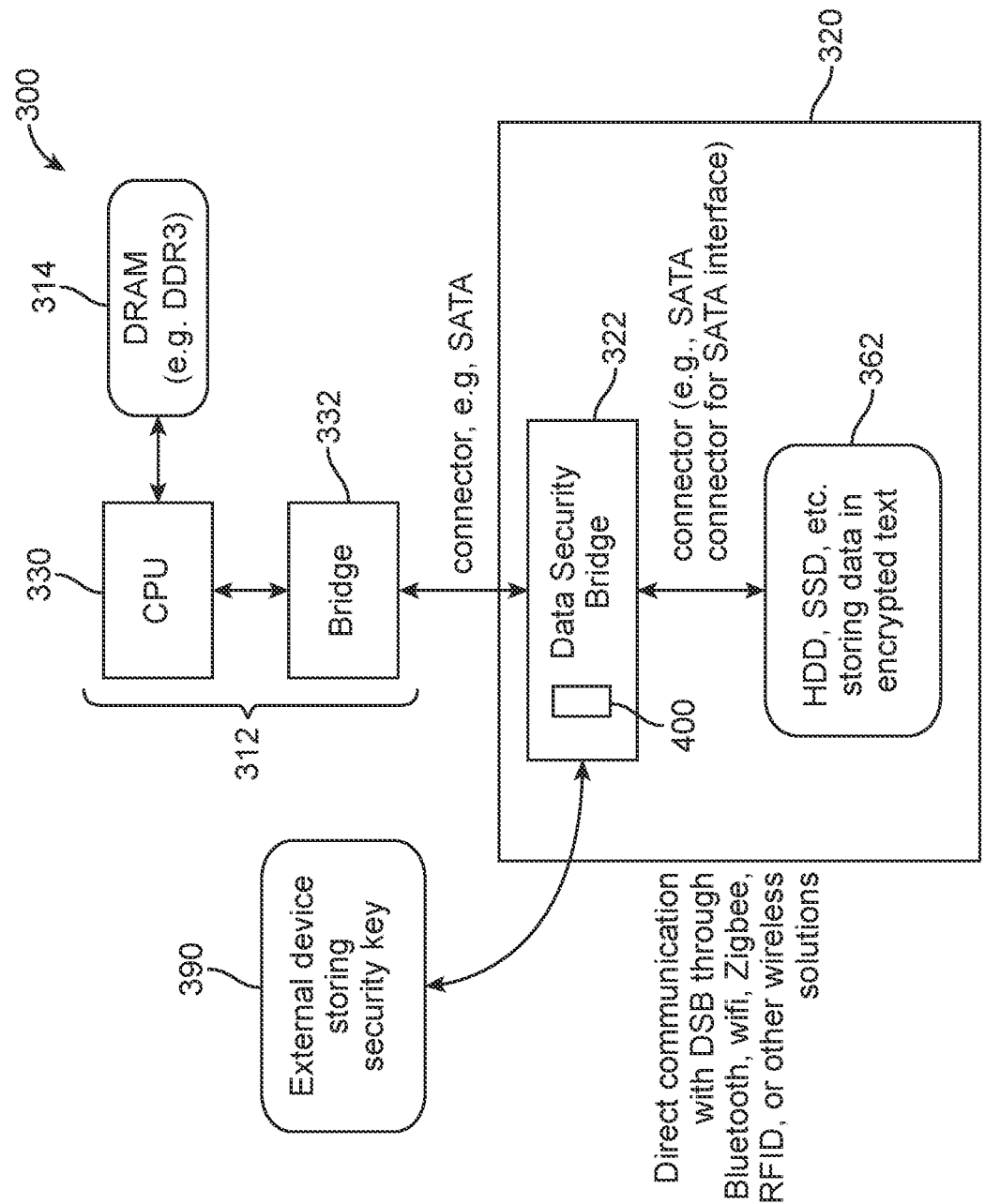
FIG. 4 illustrates another system that includes a storage device.

In the above embodiments, the second security key is described as being received directly by the station 312 that is then passed to the data security bridge 322 of the storage device 320. In other embodiments, the second security key may be received directly by the storage device 320 without going through the station 312 (FIG. 4). For example, the storage device 320 may include a wireless receiver 400 configured to receive the second security key from another device 390. The wireless receiver 400 may be implemented as a part of the data security bridge 322, or may be as a separate component that is coupled to the data security bridge 322. The other device 390 may be a cell phone, an iPad, a tablet, another computer, or any of other devices that has the capability of transmitting wireless signals. The wireless receiver 400 may communication with the other device via Bluetooth, wifi, Zigbee, RFID, or any of other wireless solutions. The wireless receiver 400 may be coupled to the data security bridge 322 of the storage device 320 for transmission of the second security key to the data security bridge 322.

It should be noted that in any of the embodiments described herein, the features of the key management module 378 may be incorporated into the security module 376. Alternatively, any of the features of the security module 376 may be incorporated into the key management module 378.

Figure 5:
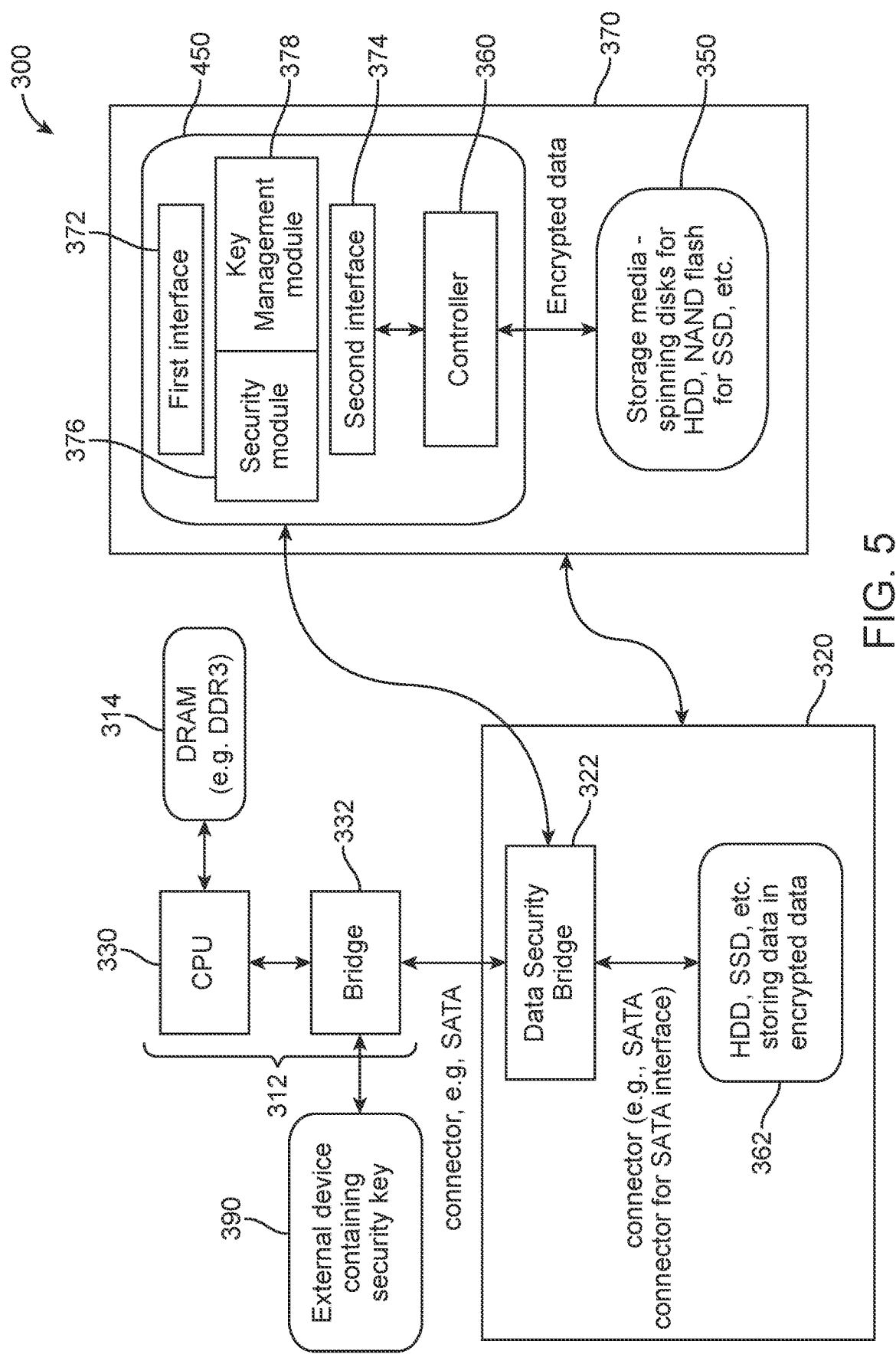
FIG. 5 illustrates another system that includes a storage device.

Also, in other embodiments, the security module 376 and the key management module 378 of the data security bridge 322, and the controller 360, may be combined and implemented in an integrated circuit (IC) chip. FIG. 5 Illustrates an example of such implementation, where the data security bridge 322 and the controller 360 are combined in an integrated circuit (IC) chip 450. In such implementation, the second interface 374 becomes an internal bus interface. The integrated solution provides a low cost solution while sacrificing the benefit of flexibility of a standalone data security bridge 322. In some embodiments, the IC chip 450 may include a processor, such as an ASIC processor, a FPGA processor, a general purpose processor, or any of other processing units, configured to perform one or more functions described herein.

Figure 6:
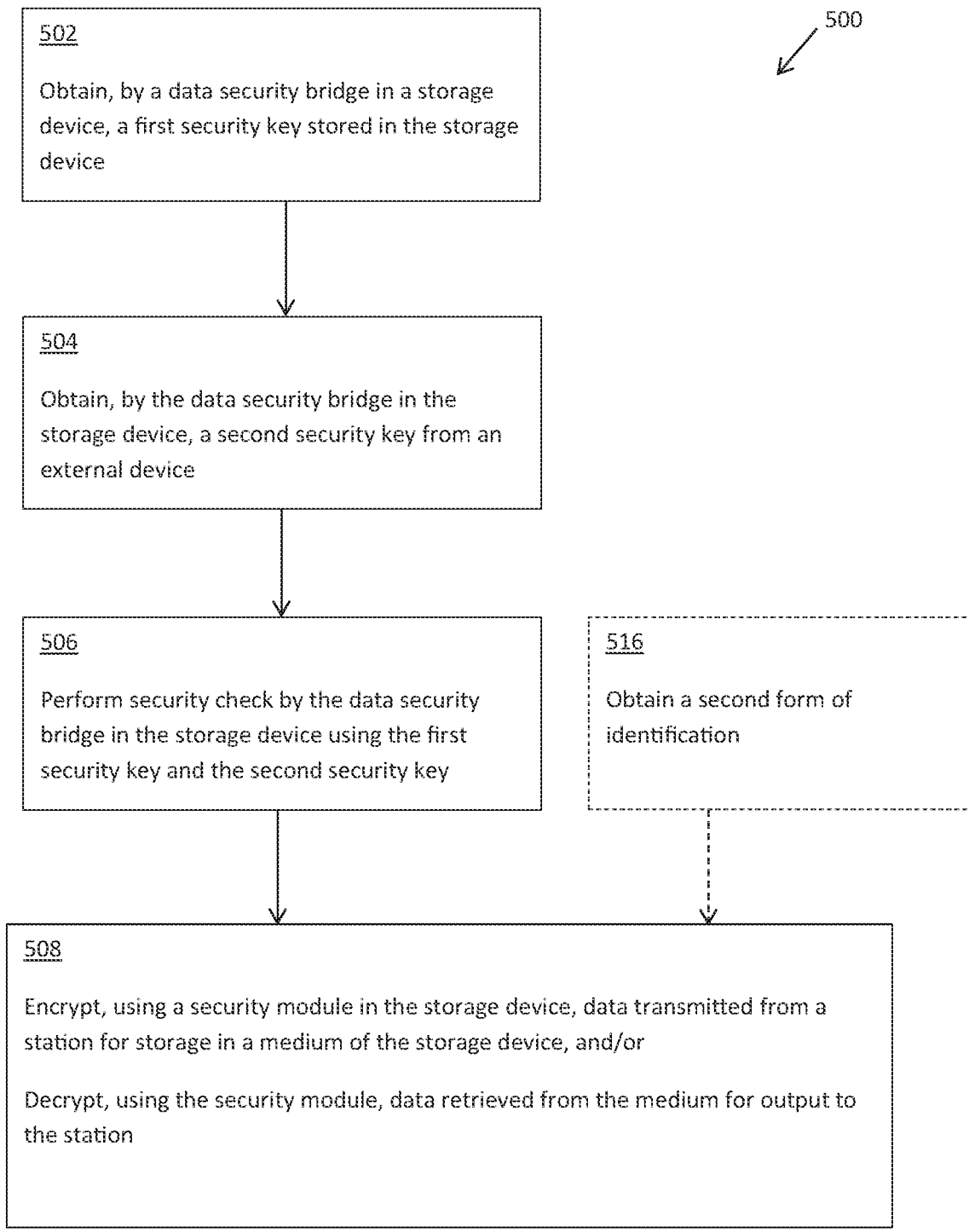
FIG. 6 illustrates a method performed by the system of FIG. 3 or FIG. 4 or FIG. 5.

FIG. 6 illustrates a method 500 that may be performed by the system of FIG. 3 or FIG. 4, or FIG. 5. First, a first security key is obtained (item 502). In some embodiments, item 502 may be performed by the key management module 378 in the data security bridge 322, which accesses the first security key stored in the storage device 320.

Next, a second security key is obtained (item 504). In some embodiments, the second security key may be obtained by the key management module 378 in the data security bridge 322 that receives the second security key through the first interface 372. The second security key may be transmitted from the external device 390, e.g., a USB, a cell phone, etc., to the station 312. The station 312 then passes the second security key to the data security bridge 322 of the storage device 320 via the first interface 372. Alternatively, the second security key may be transmitted wirelessly from the external device 390, e.g., cell phone or another external device, and is received wirelessly by the wireless receiver 400 at the storage device 320.

Next, the key management module 378 uses both the first key and the second key to perform a security check (item 506). As discussed, in some embodiments, the first key may be a reference key, and the key management module 378 may compare the first key with the second key to see if they match. If so, the key management module 378 may determine that the user providing the external device 390 with the second security key is a "trusted" user. In other embodiments, the key management module 378 may generate a signature using both the first security key and the second security key. In such cases, the key management module 378 may then compare the signature with a reference signature stored in the storage device 320. The reference signature may be generated previously during an initialization process using the first security key and a second security key provided from a "trusted" external device. If the signatures match, the key management module 378 may determine that the user providing the external device 390 with the second security key is a "trusted" user.

After the security check is performed, the security module 376 may encrypt data transmitted from the station 312 for storage in the medium 350 of the storage device 320, and/or the security module 376 may decrypt data retrieved from the medium 350 for output to the station 312 (item 508). In some embodiments, after the security module 376 encrypts data, the data security bridge 332 then outputs the encrypted data for transmission to the controller 360 via a connector, such as a SATA connector, m.2 connector, U.2 connector, a PCIe connector, an Ethernet connector, etc. Similarly, in some embodiments, encrypted data stored in the medium 350 may be transmitted to the data security bridge 332 (for decryption by the security module 376) via the connector, which may be a SATA connector, m.2 connector, U.2 connector, a PCIe connector, an Ethernet connector, etc.

Optionally, before item 508 is performed, the station 312 may obtain a second form of identification from the user of the station 312 (item 516). By means of non-limiting examples, the second form of identification may be a user password that is entered by the user via a keypad or touch screen at the station 312, a finger print obtained by a finger print reader at the station 312, a retina feature obtained by a retina scan, or a voice signature obtained by a microphone at the station 312, etc. After the second form of identification is obtained, the station 312 and/or the storage device 320 then authenticates such secondary identification. Item 508 will be performed only when (1) the security check in item 506 is successfully performed, and (2) the second form of user identification in item 516 is authenticated.

In the above embodiments, the storage device 320 is described as being coupled to the station 312. In other embodiments, the storage device 320 may be considered as a part of the station 312 that is configured to communicate with another part of the station 312. Accordingly, as used in this specification the term "station" may or may not include the storage device 320.

Although the above embodiments have been described with reference to the storage device 320 having a certain "trusted" user/external device, in other embodiments, the storage device 320 may have multiple "trusted" users/external devices. For example, in other embodiments, a medium at the storage device 320 may store multiple first security keys that belong to different users. During use, a first user may use a first external device to provide a second security key to the storage device 320. The key management module 378 then searches the first security keys to determine if any of the first security keys matches the second security key. If so, the key management module 378 may determine that the first user is a "trusted" user, and may allow operations to be performed on the medium 350 of the storage device 320. In another use, a second user different from the first user may provide a second external device, which provides another second security key to the storage device 320. The second security key from the second device of the second user is different from the second security key from the first device of the first user. The key management module 378 then searches the first security keys to determine if any of the first security keys matches the second security key from the second external device. If so, the key management module 378 may determine that the second user is also a "trusted" user, and may allow operations to be performed on the medium 350 of the storage device 320. Thus, the same storage device 320 may be used by multiple users. In some cases, the medium 350 in the storage device 320 may be partitioned into different portions for the different respective users.

In other embodiments, a medium at the storage device 320 may store multiple signatures that belong to different users. During use, a first user may use a first external device to provide a security key to the storage device 320. The key management module 378 then generates a signature using the security key from the first external device, and searches the signatures already stored in the storage device 320 to determine if any of them matches the created signature. If so, the key management module 378 may determine that the first user is a "trusted" user, and may allow operations to be performed on the medium 350 of the storage device 320. In another use, a second user different from the first user may provide a second device with another security key, which is transmitted to the storage device 320. The security key from the second device of the second user is different from the security key from the first device of the first user. The key management module 378 then generates a signature using the security key from the second device, and searches the signatures in the storage device 320 to determine if any of them matches the created signature. If so, the key management module 378 may determine that the second user is also a "trusted" user, and may allow operations to be performed on the medium 350 of the storage device 320.

In further embodiments, the storage device 320 may store multiple identifications (such as passwords) associated with multiple "trusted" users. In such cases, the key management module 378 may use the stored identifications (such as passwords) to authenticate different users.

In some of the above embodiments, the station 312 has been described as being coupled with the storage device 320 and being configured to obtain a key from an external device 390. It should be noted that the station 312 is not limited to obtaining the key directly from the external device 390, and may instead be configured to obtain the key indirectly from the external device 390. For example, in other embodiments, a user may be using another station (second station) that communicates with the station 312 (first station) remotely (e.g., via a network such as the Internet). In such cases, the user may provide the external device 390 for transmitting its key to the second station. The second station then transmits the key to the first station 312 where the storage device 320 is located. In such cases, after the key has been used by the storage device 320 to perform an authentication, the user of the second station may then obtain data from the storage device 320 at the first station. Accordingly, a user of the station 312 and/or the storage device 320 is not limited to a user who uses the station 312 and/or the storage device 320 directly, and may include a user who uses the station 312 and/or the storage device 320 remotely. In other embodiments, in addition to checking the key from the external device, the storage device may also check a second form of identification from the user. For example, the user of the second station may provide a second form of identification, which is then transmitted from the second station to the first station 312. The storage device 320 then checks the second form of identification. If the second form of identification satisfies a first criteria (e.g., it matches with a reference identification) and if the key from the external device 390 satisfies a second criteria (e.g., it matches with a reference key), then the user will be allowed to access the encrypted data at the storage device 320. The second form of identification may be a user password, a finger print, a retina scan, a voice signature, etc.

Specialized Processing System

Figure 7:
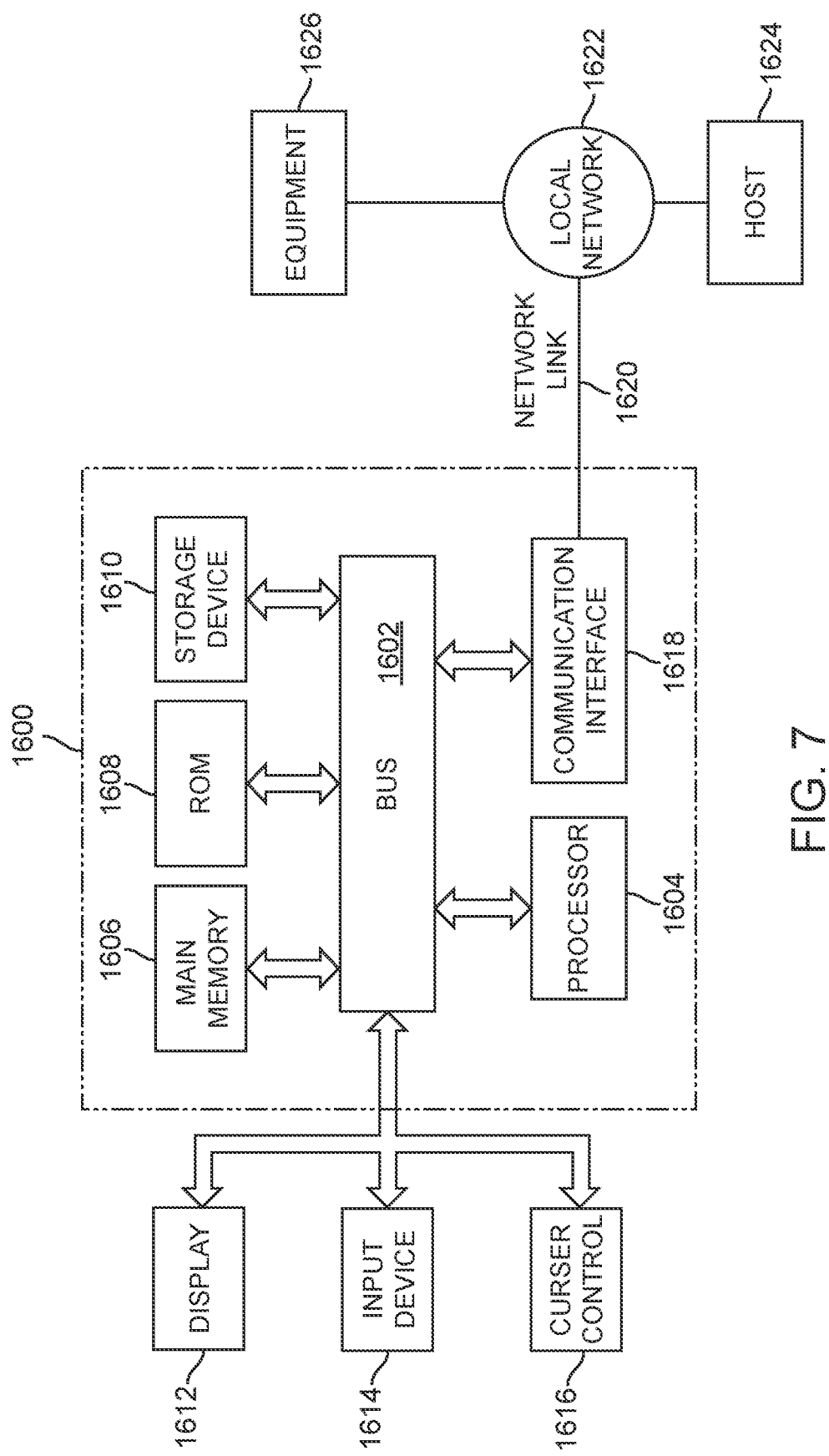
FIG. 7 illustrates an example of a specialized processing system with which one or more embodiments described herein may be implemented.

FIG. 7 is a block diagram illustrating an embodiment of a specialized processing system 1600 that can be used to implement various embodiments described herein. For example, the processing system 1600 may be an example of the station 12/212/312 described herein.

Referring to FIG. 7, the processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 1612, such as a cathode ray tube (CRT), for displaying information to a user. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a telephone line using a modem. A modem local to the processing system 1600 can receive the data on the telephone line and use an infrared transmitter to convert the data to an infrared signal. An infrared detector coupled to the bus 1602 can receive the data carried in the infrared signal and place the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A storage device comprising:
a controller;
a storage medium coupled to the controller; and
a data security bridge comprising a security module and a key management module;
wherein the controller, the storage medium, and the data security bridge comprising the security module and the key management module are parts of the storage device;
wherein the security module of the storage device is configured to perform both data encryption to obtain encrypted user data and also data decryption to obtain decrypted user data;
wherein the key management module of the storage device is configured to obtain a first security key stored in the storage device, obtain a second security key transmitted from an external device outside the storage device to the storage device, and perform a user authentication based on the first security key and the second security key;
wherein the key management module is configured to perform the user authentication in the storage device, and the security module is configured to perform the data encryption and the data decryption in the storage device, so that the user authentication, the data encryption, and data decryption all occur inside the storage device; and
wherein key management module is configured to generate a signature based on the second security key transmitted from the external device, and to perform the user authentication by comparing the signature with the first security key in the storage device.

2. The storage device of claim 1, further comprising a first interface for communication with a station, and a second interface configured to allow communication between the data security bridge with the controller.

3. The storage device of claim 2, wherein the first interface and the second interface are of a same type.

4. The storage device of claim 2, wherein the first interface and the second interface are of different types.

5. The storage device of claim 2, wherein the second interface is an internal interface integrated with the controller.

6. The storage device of claim 1, wherein the key management module is configured to perform the user authentication based on the first security key and the second security key each time the storage device is boot up from shutdown mode.

7. The storage device of claim 1, wherein the key management module is configured to perform the user authentication based on the first security key and the second security key each time the storage device is waken up from power saving mode.

8. The storage device of claim 1, further comprising a first interface and a second interface, wherein the security module is configured to receive user data via the first interface, and perform the data encryption on the received user data to obtain the encrypted user data; and
wherein the second interface is configured to transmit the encrypted user data to the controller.

9. The storage device of claim 1, further comprising a first interface and a second interface, wherein the controller is configured to retrieve the encrypted user data from the storage medium, and transmit the encrypted user data to the security module via the second interface; and wherein the security module is configured to decrypt the encrypted user data to obtain the decrypted user data, and transmit the decrypted user data out of the storage device via the first interface.

10. The storage device of claim 1, further comprising a housing for accommodating the controller, the storage medium, and the data security bridge.

11. The storage device of claim 1, wherein the key management module of the data security bridge comprises a medium configured to store the first security key.

12. The storage device of claim 1, wherein the controller, the security module, and the key management module are integrated in an integrated circuit (IC) chip.

13. The storage device of claim 1, wherein the second security key is stored in a USB or a cell phone.

14. The storage device of claim 1, wherein storage device is configured to communicatively coupled with a bridge of a station via a connector, the connector comprising a SATA connector, a m.2 connector, a PCIe connector, an Ethernet connector, or a U.2 connector.

15. The storage device of claim 1, further comprising a wireless receiver, wherein the storage device is configured to obtain the second security key via the wireless receiver.

16. The storage device of claim 1, wherein the data security bridge further comprises a random number generator.

17. The storage device of claim 1, wherein the storage medium is configured to store the encrypted user data.

18. The storage device of claim 1, wherein the storage medium comprises a spinning disk.

19. The storage device of claim 1, wherein the storage medium comprises HDD, or NAND flash.

20. The storage device of claim 1, wherein the encrypted user data comprises user-provided data that is encrypted by the security module of the storage device.

21. A station comprising a storage device, the storage device comprising:
a controller;
a storage medium coupled to the controller; and
a data security bridge comprising a security module and a key management module;
wherein the security module is configured to perform data encryption to obtain encrypted user data and/or data decryption to obtain decrypted user data;
wherein the key management module is configured to obtain a first security key stored in the storage device, obtain a second security key transmitted from an eternal device outside the storage device to the storage device, and perform a user authentication based on the first security key and the second security key;
wherein the key management module is configured to perform the user authentication in the storage device, and the security module is configured to perform the data encryption and the data decryption in the storage device, so that the user authentication, the data encryption, and the data decryption all occur inside the storage device; and
wherein key management module is configured to generate a signature based on the second security key transmitted from the external device, and to perform the user authentication by comparing the signature with the first security key in the storage device.

22. The station of claim 21, wherein the station is configured to obtain a user identification that is different from the second security key.

23. The station of claim 22, wherein the user identification comprises a user password.

24. The station of claim 22, wherein the user identification comprises a finger print, a retina scan, or a voice signature.

25. The station of claim 21, wherein the station is configured to receive the second security key from an external device, and pass the second security key to the key management module in the storage device.

26. The station of claim 25, wherein the external device comprises a USB.

27. The station of claim 25, wherein the external device comprises a cell phone.

28. The station of claim 25, comprising:
a device detector configured to detect the external device;
a boot-up and/or wake-up controller configured to pause a boot-up and/or wake-up process in response to the device detector detecting the external device; and
a notification generator configured to notify a user to remove the external device.

29. The station of claim 28, wherein the boot-up and/or wake-up controller is configured to resume the boot-up and/or wake-up process in response to the user removing the external device.

30. A method performed by a storage device, the method comprising:
obtaining user data;
performing data encryption to encrypt the user data to obtain encrypted user data;
storing the encrypted user data in a storage medium in the storage device;
obtaining a first security key from a medium in the storage device;
obtaining a second security key transmitted from an external device;
performing a user authentication by a key management module in the storage device based on the first security key and the second security key;
retrieving the encrypted user data from the storage medium in the storage device based at least in part on a result of the act of performing the user authentication; and
performing data decryption to decrypt the encrypted user data;
wherein the user authentication, the data encryption, and the data decryption are all performed inside the storage device; and
wherein the method further comprises generating, by the storage device, a signature based on the second security key transmitted from the external device, and wherein the user authentication is performed by comparing the signature with the first security key in the storage device.

31. The method of claim 30, further comprising obtaining a user identification from a user, wherein the encrypted user data is retrieved from the storage medium in the storage device if the user identification satisfies a criteria and if the user authentication succeeds.

32. The method of claim 31, wherein the user identification comprises a user password, a fingerprint, a retina scan, or a voice signature.

33. The method of claim 30, wherein the external device comprises a USB or a cell phone.

34. The method of claim 30, wherein the storage device comprises a wireless receiver, and wherein the second security key is obtained by the storage device using the wireless receiver.

35. The method claim 30, wherein the storage device is coupled to a station, and wherein the second security key is transmitted from the external device to the station, which passes the second security key to the storage device.

36. The method of claim 35, further comprising:
    detecting a presence of the external device by the station;
    pausing a boot-up and/or a wake-up process in response to the detected presence of the external device; and
    notifying a user to remove the external device.

37. The station of claim 36, further comprising resuming the boot-up and/or wake-up process in response to the user removing the external device.

\* \* \* \* \*

UNITED STATES PATENT AND TRADEMARK OFFICE
CERTIFICATE OF CORRECTION

| | |
|---|---|
| PATENT NO. | : 10,929,572 B2 |
| APPLICATION NO. | : 15/483718 |
| DATED | : February 23, 2021 |
| INVENTOR(S) | : Wu |

Page 1 of 1

It is certified that error appears in the above-identified patent and that said Letters Patent is hereby corrected as shown below:

On the Title Page

Item (73), under Assignee, replace "Nyquist Semiconductor Limited, Grand Cayman (KY) with "Innogrit Technologies Co., Ltd., Shanghai, China".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*